(12) United States Patent
Takano

(10) Patent No.: US 7,469,721 B2
(45) Date of Patent: Dec. 30, 2008

(54) THREAD PROTECTOR FOR A PIPE

(75) Inventor: Takahiro Takano, Wakayama (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 233 days.

(21) Appl. No.: 10/924,843

(22) Filed: Aug. 25, 2004

(65) Prior Publication Data
US 2006/0042709 A1 Mar. 2, 2006

(51) Int. Cl.
B65D 59/06 (2006.01)

(52) U.S. Cl. ................. 138/96 T; 220/213

(58) Field of Classification Search ........... 138/96 T; 220/213, 304
See application file for complete search history.

(56) References Cited

U.S. PATENT DOCUMENTS

| | | | | |
|---|---|---|---|---|
| 1,708,657 A | * | 4/1929 | Brown et al. | 138/96 T |
| 2,727,651 A | * | 12/1955 | Mickelson | 220/792 |
| 3,074,579 A | * | 1/1963 | Miller | 215/344 |
| 4,337,799 A | * | 7/1982 | Hoover | 138/96 T |
| 4,487,228 A | * | 12/1984 | Waldo et al. | 138/96 T |
| 4,582,090 A | * | 4/1986 | Chase et al. | 138/96 T |
| 4,655,256 A | * | 4/1987 | Lasota et al. | 138/96 T |
| 4,796,668 A | | 1/1989 | Depret | |
| 4,809,752 A | * | 3/1989 | Strodter | 138/96 T |
| 6,196,270 B1 | * | 3/2001 | Richards et al. | 138/96 T |
| 2005/0045240 A1 | * | 3/2005 | Casteran | 138/96 T |
| 2005/0166986 A1 | * | 8/2005 | Dell'erba et al. | 138/96 T |

FOREIGN PATENT DOCUMENTS

| | | |
|---|---|---|
| JP | 09-072467 | 3/1997 |
| JP | 09-095940 | 4/1997 |
| JP | 09-303672 | 11/1997 |
| JP | 11-201371 | 7/1999 |
| JP | 11-201372 | 7/1999 |
| JP | 2001-199469 | 7/2001 |

* cited by examiner

Primary Examiner—James F Hook
(74) Attorney, Agent, or Firm—Clark & Brody

(57) ABSTRACT

A thread protector for protecting threads of a pipe includes a body having female or male threads shaped for threaded engagement with male or female threads formed on a pin or box end of a pipe. An elastically flexible annular sealing projection extends from the body to a location where it will be elastically flexed by and in line contact with an end surface of the pipe when the threads of the protector are engaged with the threads of the pipe. The thread protector can protect the threads of a pipe against deposition of dirt and against rusting without application of grease.

21 Claims, 7 Drawing Sheets

THREAD PROTECTOR FOR A PIPE

BACKGROUND OF THE INVENTION

1. Technical Field

This invention relates to a thread protector for protecting male or female threads formed on the outer or inner surface of a threaded end portion of a metal pipe such as a steel pipe.

2. Description of the Related Art

Steel pipes or more generally metal pipes are typically formed with male or female threads on both ends for connecting pipes with each other in series. Thus, an end portion of a steel pipe is used to form a threaded joint. An end portion of a steel pipe having male threads is called a pin or pin end, while an end portion having female threads is called a box or box end. Some steel pipes have a pin on one end and a box on the other end. Other steel pipes have a pin on both ends and are connected with each other via a coupling having a box or female threads on both sides.

In order to protect pipe threads against rusting and deposition of foreign matter (referred to below simply as dirt) throughout the period of time between the formation of threads and the use of the pipes by a customer and to protect the threads against galling when the threads on two pipes are interconnected, it is common to apply a grease having a relatively high viscosity to the threads. In addition, in order to protect the threads against scratching when pipes rub against each other or against other objects, it is common to fit a thread protector on each end of a pipe so as to cover the threads of the pipe. The thread protector usually has threads for threaded engagement with the pipe, namely, it has female threads for protecting a pin end or male threads for protecting a box end.

A typical conventional thread protector for protecting a pin end of a steel pipe is shown in FIG. 8(a). A metal pipe 2 of steel or other material has male threads 2b on the outer surface of a generally tapered pin formed on an end of the pipe. The end surface 2a of the pipe 2 is designed for abutment against an internal shoulder formed on a box end of another pipe to be connected to pipe 2. The pin end of the pipe 2 is surrounded by a thread protector 1 having female threads 1b to protect the male threads 2b of the pipe 2. The protector 1 has an internal shoulder 1a for abutment against the end surface 2a of the pipe 2, and it is secured to the pipe 2 by being screwed onto the pipe 2 until its shoulder 1a abuts against the end surface 2a of the pipe.

The grease used for protecting threads often contains heavy metals, which pose an environmental hazard. Therefore, in recent years, particularly with OCTG (oil country tubular goods) for use in oil wells, especially in off-shore oil wells, for the production of crude oil, a lubricating method which does not use grease has been proposed, such as in JP-A 9-72467, with the object of preventing environmental pollution.

When such a lubricating method which does not employ grease is used in combination with a conventional thread protector, although it is possible to obtain good lubricating properties when connecting pipes with each other and to adequately prevent scratching of the threads of a pipe, this method has inadequate ability to protect the threads against deposition of dirt and to protect against rusting, which are fractions performed by conventional grease.

Therefore, when using a lubricating method which does not employ grease, it is desired for a thread protector, which has been used in the past to prevent scratching of threads, to perform the additional functions of protecting the against deposition of dirt and rusting. In recent years, there have been various proposals of means for accomplishing these functions in a thread protector.

For example, Japanese Patent No. 3,149,746 discloses a male thread (or pin) protector which increases the ability of the protector to fit on a pin by making the length of the female threads of the protector shorter than the length of the male threads of the pin being protected. However, that thread protector is only suited for use on the male threads of a pipe, and it cannot be used to protect female threads (or a box). In addition, no consideration is given to imparting the protector with the ability to protect pipe threads against dirt and rusting.

U.S. Pat. No. 4,796,668 discloses protectors for the male and female threads of pipes which can protect the threads against dirt and water by providing line contact between lips formed on the protector and surfaces of a pipe on which the protector is mounted.

However, that thread protector has the drawback that manufacture of the protector requires a large number of steps, so it has problems with respect to manufacturing efficiency.

In addition, forming a seal between the protector and the end surface of a pipe being protected relies upon compression of the elastic material forming the body of the protector. Therefore, if a small amount of looseness develops between the protector and a pipe on which it is mounted during the period until the pipe is used by a customer (during this time, pipes may rub against each other when they are transferred between different vehicles such as ships, trains, and trucks, and as a result of this rubbing, a protector may slightly loosen with respect to a pipe), the surface pressure acting between the body of the protector and the steel pipe will decrease, and a gap may even develop between the two. As a result, water may seep to the threads of the pipe from the interior of the pipe.

JP-A 09-303672 discloses a protector for protecting the male threads of a steel pipe which includes an elastic sealing ring located on the interior of the protector for preventing water from seeping from the interior of the pipe on which the protector is mounted to the male threads during a hydrostatic pressure test of the pipe.

However, that thread protector is only capable of protecting the male threads (the pin) of a pipe and cannot be used to protect the female threads (the box) thereof. In addition, since the elastic sealing ring is formed separately from the body of the protector, the two must be combined with each other before the protector can be used, which makes the use of the protector bothersome. Furthermore, when the protector is to be discarded or recycled, it may be necessary to separate the sealing ring from the body of the protector, so the costs of discarding or recycling are increased. In addition, that thread protector does not have any provision for preventing water from seeping to the threads from the exterior of a pipe.

Japanese Patent No. 3,223,874 discloses a protector for protecting male threads which can prevent pressurized water from seeping to the threads of a steel pipe from the interior of the pipe during a hydrostatic pressure test. The protector has an end plate which is contacted by the end surface of a pipe. The thickness of the end plate increases towards the radial center of the protector.

However, that thread protector can only be used to protect the male threads of a pipe, and it cannot be used to protect female threads. In addition, the protector relies solely on the elasticity of the material forming the protector to form a seal against the inner surface of a steel pipe. Therefore, when a slight looseness develops between the protector and a steel pipe on which it is installed during the period until the pipe is used by a customer, the surface pressure acting between the protector and the steel pipe decreases and a gap may even develop between them, so water may seep to the threads of the pipe from the interior of the pipe. In addition, this thread protector does not give any consideration to preventing water from seeping from the exterior of a pipe.

JP-A 11-201371 discloses a thread protector which can protect the threads on the end of a steel pipe without the protector itself having any threads formed on the body of the protector. The protector is comprised of an inner foamed resin layer and an outer non-woven fabric layer. Thus, this thread protector is merely designed to protect the threads of a pipe against damage by impact, and it is not intended to protect the pipe against rusting. Therefore, application of a grease is necessary to protect the threads of a pipe against rusting.

JP-A 2001-199469 discloses a thread protector which can prevent the outflow of an antirust composition such as a grease applied to the reads of a pipe by defining the size of the gaps formed between the threads of a pipe and the threads of the protector. Thus, rust prevention of the threads of a pipe is guaranteed by an antirust composition such as a grease applied to the threads. The protector does not have a sealing mechanism for protecting other portions of the end of a pipe besides the threads against dirt and rusting, such as the sealing surfaces of a pipe which form seals when the pipe is connected to another pipe.

FIGS. 7(a) and 7(b) show another technique which is conceivable in order to protect the threads of a pipe (having a pin end with male threads in FIG. 7(a) or a box end with female threads in FIG. 7(b)) against deposition of dirt and water seepage from the exterior of a steel pipe. In the technique shown in these figures, a gap between a thread protector 1 and a steel pipe 2 is sealed by elastic tape 3 such as plastic adhesive tape, However, with such a technique, when steel pipes rub against each other when being transferred between different vehicles, for example, before they are used by a customer, there is the possibility of the elastic tape tearing and of dirt and water reaching the threads of the pipe through the torn portions of the tape. In addition, with this technique, it is necessary to peel off the elastic tape prior to using a pipe, so the operating efficiency of pipe connection is decreased.

SUMMARY OF THE INVENTION

This invention provides a thread protector for a metal pipe such as a steel pipe which can effectively protect the threads of the pipe against dirt and water without using grease. It also provides a thread protector which can prevent the penetration of dirt and water to the threads of a pipe from either the interior or exterior of the pipe. It further provides a thread protector which can protect either the male or female threads of a pipe, or in other words, a pin or box end of a pipe.

In order to protect a threaded end portion of a pipe against dirt and rusting without using grease, it is necessary to isolate the threaded end portion of the pipe from the other interior and exterior surface areas of the pipe which are not protected by a thread protector.

In order to perform this isolation, it is conceivable to seal a gap between a thread protector and a pipe by elastic tape or similar material, as discussed previously by reference to FIGS. 7(a) and 7(b), or by an elastic sealing member disposed between the thread protector and the pipe, as disclosed in JP-A 09-303672. However, these techniques have various problems, as already discussed.

It is also conceivable to form a thread protector with finished dimensions such that the protector has a perfectly complementary interior or exterior shape with respect to the pin or box end of a pipe on which it is to be mounted so as to eliminate gaps between the thread protector and the pipe. However, since a protector and a pipe are both industrial products, due to manufacturing errors, the occurrence of gaps between the two is unavoidable, and dirt and water can penetrate through the gaps which are formed. Even if the gaps are minimized water can seep to the threads by capillary action.

The present invention relies on the following findings to overcome the above-described problems of conventional thread protectors.

(1) A gap is provided between the sealing surfaces such as the end surfaces of a thread protector and of a pipe being protected in order to prevent the seepage of water by capillary action.

(2) The gap is sealed with a sealing member which is capable of maintaining its sealing ability even if unintentional loosening of a thread protector secured to a pipe occurs before the pipe is used by a customer. For this purpose, the sealing mechanism should not only exhibit elasticity of the material constituting the sealing member but also allow for further movement which is realized by making the member flexible.

(3) In order to reduce manufacturing and disposal costs, the sealing member is preferably integral with the body of a thread protector, and the thread protector and the sealing member are preferably made of a synthetic resin, although the body of the protector may be reinforced by a metallic material, if necessary.

According to one form of the present invention, a thread protector for protecting threads of a pipe includes a body having threads which are shaped for threaded engagement with threads formed on a threaded end portion of a pipe, i.e., a pin end or a box end of a pipe. An elastically flexible annular sealing projection extends from the body to a location where it will be elastically flexed by and in line contact with an end surface of the pipe when the threads of the protector are engaged with the threads of the pipe.

When the thread protector is for protecting the male threads formed on a pin end of a pipe, the body of the protector has an inner surface having female threads for engaging the male threads of the pin end of the pipe, and the sealing projection is disposed on an interior of the body of the protector. When the thread protector is for protecting the female threads formed on a box end of a pipe, the body of the protector has an outer surface having male threads for engaging the female threads of the box end of the pipe, and the sealing projection is disposed on an exterior of the body of the protector.

With the above-described structure, a thread protector according to the present invention can effectively prevent dirt and water from penetrating to the male or female threads of a pipe without using grease.

A pin end of a pipe is frequently tapered for ease of insertion, and thus the internal shape of a box end which receives the pin end is correspondingly flared out, thereby forming tapered threads. In such cases, the body of the protector also has tapered threads so as to engage the tapered threads of the pin or box of the pipe.

When pipes are to be connected by use of a coupling, a coupling is often previously connected to one end of a pipe before shipment of the pipe. Typically, such a coupling has female threads on at both sides and is connected to a pipe having male threads at both of its ends by engaging the female threads on one side of the coupling with the male threads at one end of the pipe. In such cases, the threads of a coupling which are not engaged with a pipe can be protected by a thread protector according to the present invention. Thus, the threads of a pin or box end of a pipe to be protected include those of a coupling which has already been connected to a pipe.

In the case of a male thread protector for protecting a pin end of a pipe and thus having female threads on the inner surface of the protector body, the protector body preferably includes an extended region having a generally cylindrical inner surface which surrounds and contacts the outer surface of an outermost part of the cylindrical body of the pipe when the threads of the pipe engage the threads of the protector. The inner surface of the extended cylindrical region of the protector body may have a helical protrusion to improve the sealing force in this region. The protrusion eliminates or minimize the formation of a gap between the outer surface of the pipe and the inner surface of the protector body, through which dirt and water can reach the male threads of the pipe.

In the case of a female thread protector for protecting a box end of a pipe and having male threads on the outer surface of the protector body, the box end of the pipe often has an internal shoulder for abutment against the end surface of a pin end of a pipe. In such a case, the protector preferably further comprises an additional elastically flexible annular sealing projection formed on an end of the body of the protector and extending to a location where it will be elastically flexed by and in line contact with the internal shoulder of the pipe (on its box end) when the threads of the protector are engaged with the threads of the pipe.

These and other features of the present invention will be more fully understood from the following description considered together with the accompanying drawings.

DESCRIPTION OF PREFERRED EMBODIMENTS

Figure 1A:
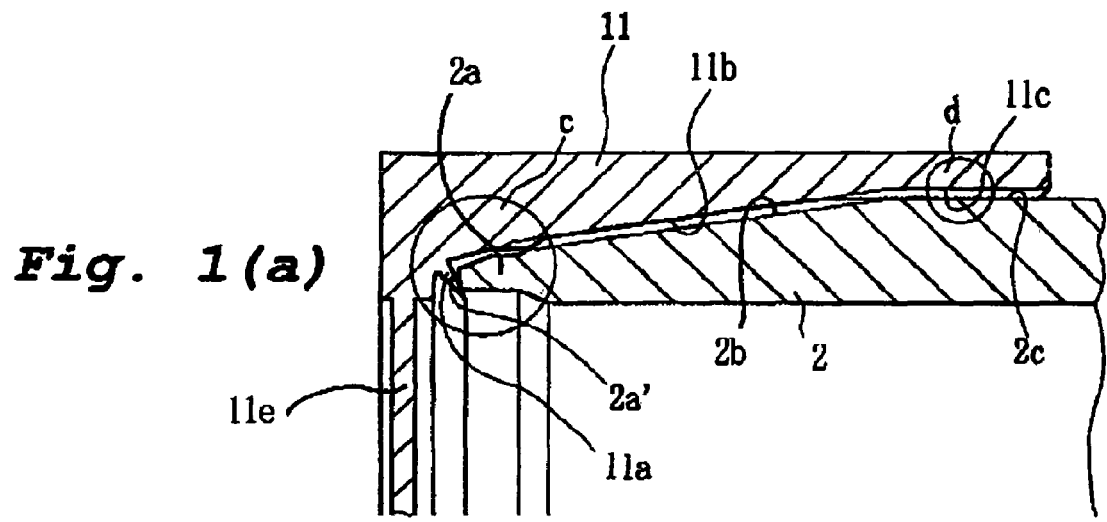
FIGS. 1(a) and 1(b) are partial schematic longitudinal cross-sectional views of two embodiments of a male thread protector according to the present invention of the type which closes off the interior of a pipe, the thread protector being shown mounted on the pin end of a pipe.

Below, embodiments of a thread protector according to the present invention will be described in further detail while referring to the accompanying drawings. It should be understood that the embodiments shown in the drawings are illustrative, and various modifications can be made without departing from the scope of the present invention which is defined by the claims.

(1) Male Thread Protector

FIGS. 1(a)-1(d) illustrate an embodiment of a male thread protector 11 according to the present invention of the type which closes off the interior of a pipe such as a steel pipe. One end of the protector is closed by a closing member 11e, which may be integral with the body of the thread protector 11. FIGS. 2(a)-2(e) illustrate an embodiment of a male thread protector 11 according to the present invention of the type which does not close off the interior of a pipe. In this embodiment, both ends of the protector 11 are open.

Each protector 11 is shown mounted on the pin end of a pipe 2 which comprises a threaded region having male threads 2b formed on the tapered outer surface of the pipe 2 and an unthreaded nose portion 2a having an end surface 2a'. The unthreaded nose portion 2a of the pipe 2 is designed to achieve a metal-to-metal contact seal when the pin end of the pipe 2 is connected to the box end of another pipe, and it may be formed in some types of threaded joints for metal pipes such as OCTG. The end surface 2a' of the pipe 2 (or more precisely, of the end nose portion 2a in the illustrated embodiment) is designed for abutting against an internal shoulder of the box end of the another pipe to which the pipe 2 is connected. The body of the thread protector 11 has female threads 11b formed on the inner surface of the protector so as to engage with the male threads 2b of the pipe 2. The inner surface of the protector 11 in the threaded region with female threads 11b is sloped (flared outwards) at the same angle to the axis of the pipe 2 as the tapered outer surface of the pin end of the pipe. Thus, the male and female threads are both tapered threads.

Figure 8A:
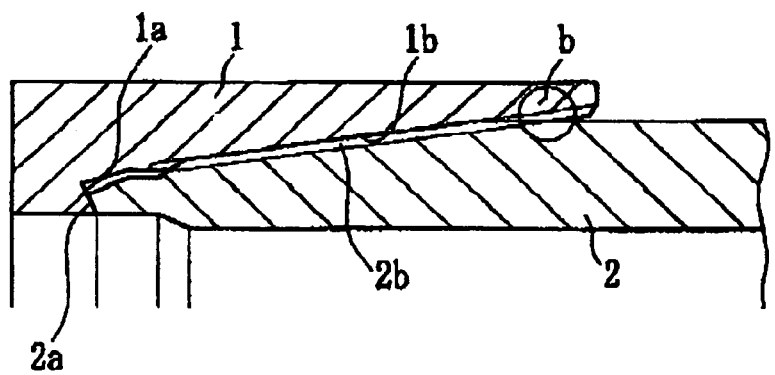
FIG. 8(a) is a partial schematic longitudinal cross-sectional view of a conventional male thread protector mounted on the pin end of a pipe.

In a conventional thread protector 1 shown in FIG. 8(a), dirt is prevented from reaching the male threads 2b of a steel pipe 2 mainly by abutting contact between an internal shoulder 1a of the protector 1 and an end surface 2a' of the pipe 2. The abutting contact is achieved by screwing the protector 1 onto the pin end of the pipe 2 for threaded engagement in the threaded portions 1b, 2b of these two members. Rust prevention (water proofing) of the male threads 2b of the pipe 2 is performed mainly by filling the gap between the female threads 1b of the protector 1 and the male threads 2b of the pipe 2 with grease.

However, as described above, after the protector 1 has been secured to the pipe 2 by threaded engagement, the protector 11 may be loosened due to impact encountered during transfer between different vehicles, for example, before the protector 11 is removed by a customer immediately before use. In this case, the abutting contact between the shoulder 1a of the protector 1 and end surface 2a' of the pipe 2 may no longer be maintained even if the protector 1 is made of an elastic material such as a plastic, resulting in the formation of a gap between the shoulders of these two members. Therefore, in the absence of another sealing mechanism, dirt and water can penetrate to the threads 2b of the pipe 2 from the interior of the pipe through the gap. Furthermore, when application of grease is omitted as is intended by the present invention, abutment of the internal shoulder 1a of the protector 1 and the end surface 2a' of the pipe 2 forms a surface contact between the protector and the pipe, which allows seepage of water to the threads of the pipe by capillary action through the contacting portions, thereby causing the threads to rust.

In order to solve these problems of the prior art, as shown in FIGS. 1(a)-1(c) and FIGS. 2(a)-2(c), a male thread protector 11 for protecting a pin end of a pipe according to the present invention is equipped with a valve-type sealing mechanism comprising an elastically flexible annular sealing projection 11a. The sealing projection 11a is located on a portion of the body of the protector 11 where it can form a seal by line contact with the end surface 2a' of the pin end of the pipe 2 when the protector 11 is secured to the pipe 2 by engagement between the female threads 11b of the protector 11 and the male threads 2b of the pipe 2. The end surface 2a' of the pin end of the pipe 2 is usually designed for abutment against an internal shoulder formed in a box end of a pipe, and it may be an end surface of an unthreaded nose portion 2a formed at the tip of the pin end of the pipe 2, as depicted.

Thus, a sealing force by the annular sealing projection 11a results from flexing of the annular sealing projection 11a by the end surface 2a' of the pin end of the pipe 2 rather than from abutting contact between an internal shoulder of the protector and the end surface 2a' of the pipe, such as occurs with a conventional thread protector as shown in FIG. 8(a). For this purpose, the threads of the pin end of the pipe 2 and the protector 11 are designed such that a sufficient gap to allow for the desired line contact of the projection 11a with the end surface 2a to form a seal remains when the protector 11 is secured to the pin end of the pipe 2 by threaded engagement.

Figure 1B:
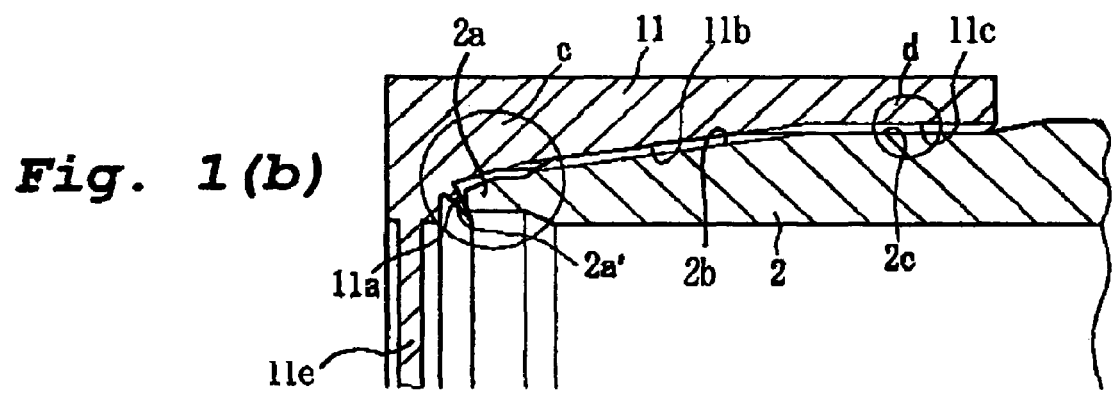
Figure 1C:
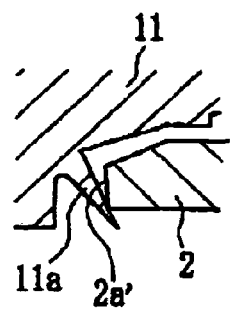
FIG. 1(c) is an enlarged view of region c of FIG. 1(a) or 1(b)
Figure 2A:
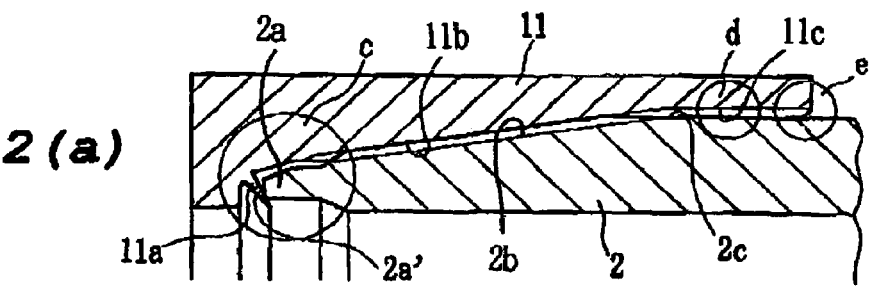
FIGS. 2(a) and 2(b) are figures similar to FIGS. 1(a) and 11(b) of different embodiments of a male thread protector according to the present invention of the type which does not close off the interior of a pipe.
Figure 2B:
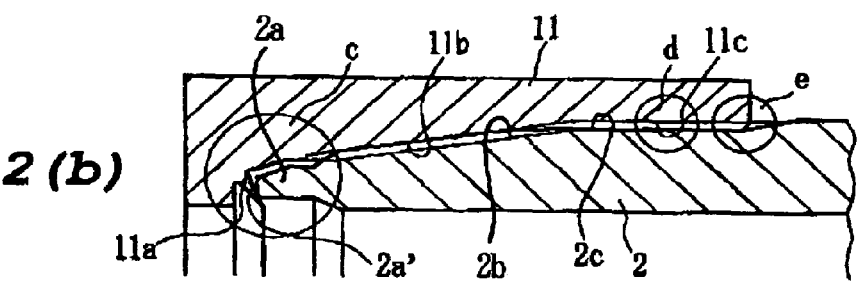
Figure 2C:
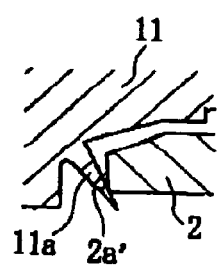
FIG. 2(c) is an enlarged view of region c of FIG. 2(a) or 2(b)

The annular sealing projection 11a is capable of flexing over a considerable range while still remaining in sealing contact with the end surface 2a', as can be seen more clearly from FIGS. 1(c) and 2(c). Therefore, even if looseness of the protector 11 with respect to the pipe 2 develops after the protector 11 is secured to the pipe 2 and before the pipe 2 is used by a customer, sealing contact between the protector 11 and the pipe 2 is maintained, and dirt and water can be prevented from reaching the threads of the pipe 2 from the interior of the pipe 2 through the gap formed at the end of the pipe 2.

The annular sealing projection 11a is in line contact with the end surface 2a' of the pin end of the steel pipe 2, so capillary action does not take place where they contact each other, and water can be prevented from seeping to the threads of the pipe 2 even without using grease between the protector 11 and the pipe 2.

As shown in FIG. 8(a), in a typical conventional male thread protector for protecting a pin end of a steel pipe, the tapered female threads 1b of a protector 1, which are shaped to engage with the tapered male treads 2b formed on a pin end of a pipe 2, extend with a constant taper beyond the end of the male threads 2b of the pipe 2 so as to cover a region of the cylindrical body of the pipe 2 adjoining the male threads 2b.

Figure 8B:
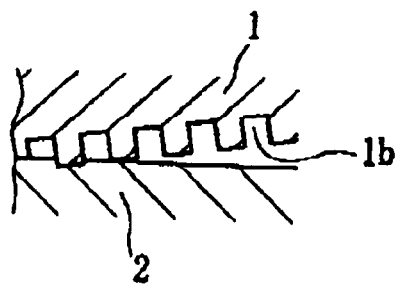
FIG. 8(b) is an enlarged view of region b of FIG. 8(a).

As a result of this structure, a gap is present between the outer surface of the pipe 2 and the threads 1b of the protector 1 near the end of the protector 1, as shown in FIG. 8(b). Conventionally, this gap is filled with grease, so the penetration of dirt and water to the threads 2b of the pipe 2 and the occurrence of rust can be prevented unless the grease runs off (which can occur in some circumstances). However, when is grease is not employed, the conventional male thread protector shown in FIGS. 8(a) and 8(b) results in the penetration of dirt and water to the threads 2b of the pipe 2 from the exterior of the pipe through the gap formed at the end of the protector 1.

In an embodiment of the present invention, as shown in FIGS. 1(a) and 1(b) and FIGS. 2(a) and 2(b), the body of the protector 11 has tapered female threads 11b which engage with the tapered male threads of the pipe 2. Thus, the inner surface of the portion of the protector 11 facing the male threads 2b of the pipe is sloped at the same angle as the tapered outer surface of the pin end of the pipe 2 and is threaded to form the tapered female threads 11b.

However, in a region 11c of the protector 11 which extends beyond the male threads 2b of the pipe 2 and surrounds a region 2c of the cylindrical body of the pipe 2 adjoining the male threads 2b, the inner surface of the protector 11 is made cylindrical and extends parallel to the axis of the pipe 2, rather than being sloped as in a conventional protector. This region 11c of the protector 11 having a cylindrical inner surface according to one embodiment of the invention is hereinafter referred to as a cylindrical region of the protector 11, while the region 2c of the pipe 2 which is surrounded by the cylindrical region 11c of the protector 11 is referred to as an outermost body region of the pipe 2. The cylindrical inner surface of the cylindrical region 11c of the protector 11 is brought into contact with the outer surface of the outermost body region 2c of the pipe 2 over the entire axial length of this region when the protector 11 is secured to the pipe 2, thereby preventing or minimizing the penetration of dirt and water to the male threads of the pipe and rusting of these threads from the exterior of the pipe 2 through a gap which may be formed at or near the end of the protector 11. In order to ensure that the cylindrical region 11c of the protector 11 performs this effect satisfactorily, the axial length of the cylindrical region 11c of the protector 11 may be slightly greater than a corresponding part of a conventional protector.

The outer surface of a commercially manufactured steel pipe is often not perfectly circular in cross section and may be elliptical. Such an elliptical shape of the outer surface of a pipe 2 interferes with the contact of the cylindrical region 11c of the protector 11 with the outer surface of the pipe 2. In order to cope with this problem, the outer surface of the outermost body region 2c of the pipe 2, which is surrounded and contacted by the cylindrical region 11c of the protector 11, may be machined to form a cylindrical machined surface having a substantially perfectly cylindrical shape with a slightly decreased outer diameter compared to the outer diameter of the remaining unmachined portion of the pipe body, as shown in FIGS. 1(b) and 2(b). As a result, the ability of the protector 11 to prevent the penetration of dirt and water to the threads of the pipe 2 can be improved.

Figure 1D:
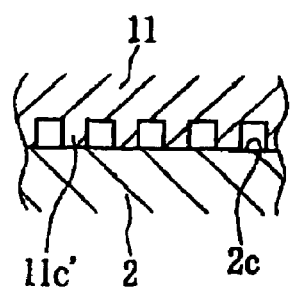
FIG. 1(d) is an enlarged view of region d of FIG. 1(a) or 1(b).
Figure 2D:
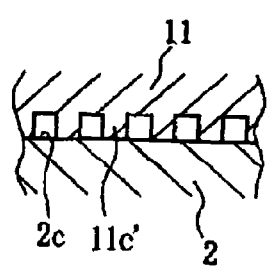
FIG. 2(d) is an enlarged view of region d of FIG. 2(a) or 2(b)

The inner surface of the cylindrical region 11c of the protector 11 preferably has a helical groove which defines a helical protrusion 11c' in the inner surface of the cylindrical region 11c, as shown in FIGS. 1(d) and 2(d). In this case, the inner surface of the cylindrical region 11c of the protector 11 contacts the outer surface of the outermost body region 2c of the pipe 2 along the helical protrusion 11c' when threaded engagement between the protector 11 and the pipe 2 is completed. The helical protrusion 11c' serves to increase the sealing ability in this region. When the helical groove is formed in the cylindrical region 11c of the protector 11, it may be either connected to or separated from the female threads 11b of the protector.

Figure 2E:
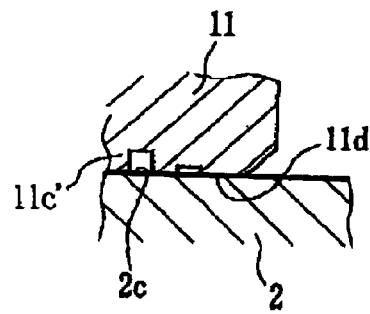
FIG. 2(e) is an enlarged view of region e of FIG. 2(a) or 2(b).

As shown in FIG. 2(e), the ability of the protector 11 (or more precisely, of the helical protrusion 11c') to prevent the penetration of dirt and water to the threads of a pipe 2 from the exterior of the pipe can be increased by terminating the helical groove defining the helical protrusions 11c' short of the end of the protector 11 (i.e., the end of the cylindrical region 11c of the protector 11 remote from the female threads 11b), thereby forming a cylindrical inner surface 11d with no helical protrusion 11c' in the vicinity of the end of the protector 11.

(2) Female Thread Protector

Figure 3:
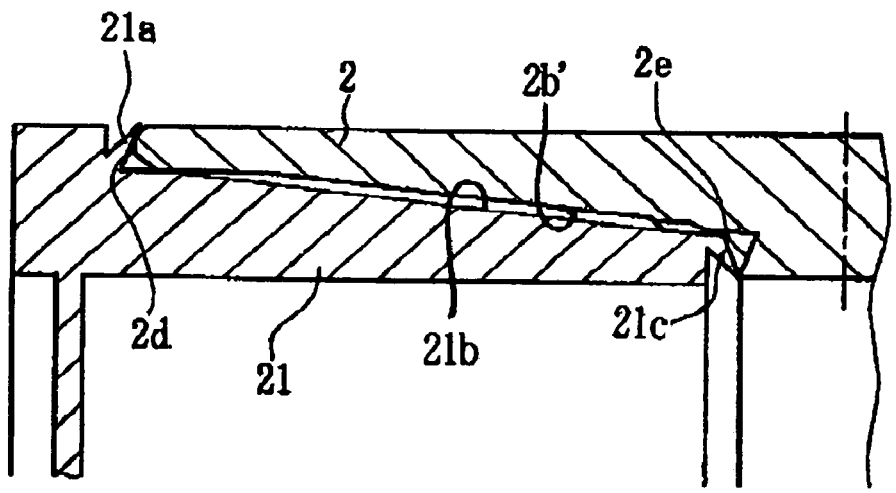
FIG. 3 is a partial schematic longitudinal cross-sectional view of an embodiment of a female thread protector according to the present invention of the type which closes off the interior of a pipe, the thread protector being shown mounted on the box end of a pipe.
Figure 4:
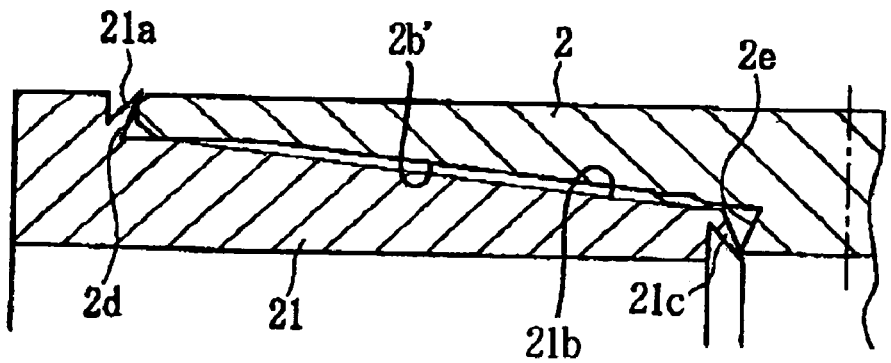
FIG. 4 is a figure similar to FIG. 3 of a different embodiment of a female thread protector according to the present invention of the type which does not close off the interior of a pipe, the thread protector being shown mounted on the box end of a pipe.

FIGS. 3 and 4 illustrate embodiments of a female thread protector 21 according to the present invention mounted on the box end of a pipe 2 such as a steel pipe having tapered female threads 2b' and an internal shoulder 2e formed on the interior of the pipe 2. The internal shoulder 2e is located at or near the proximal end of the box of the pipe 2, i.e., between the female threads 2b' and the cylindrical body of the pipe 2. In the depicted embodiments, the box end of the pipe 2 has an optional unthreaded metal-to-metal contact portion between the female threads 2b' and the internal shoulder 2e. The embodiment of FIG. 3 is a female thread protector 21 which has a closing member 21e to close off the interior of a pipe 2 on which it is mounted, while the embodiment of FIG. 4 is one which does not close off the interior of a pipe 2. Each protector 21 has a body formed with tapered male threads 21b for threaded engagement with the tapered female threads of the pipe 2.

Figure 7A:
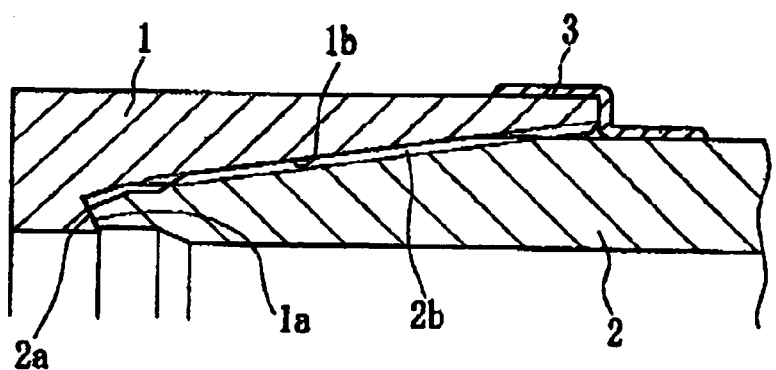
FIGS. 7(a) and 7(b) are partial schematic longitudinal cross-sectional views of a conventional male thread protector and a conventional female thread protector mounted on the pin end and the box end, respectively, of a pipe, with the gap between the outer surface of the pipe and the protector being sealed with an elastic tape
Figure 7B:
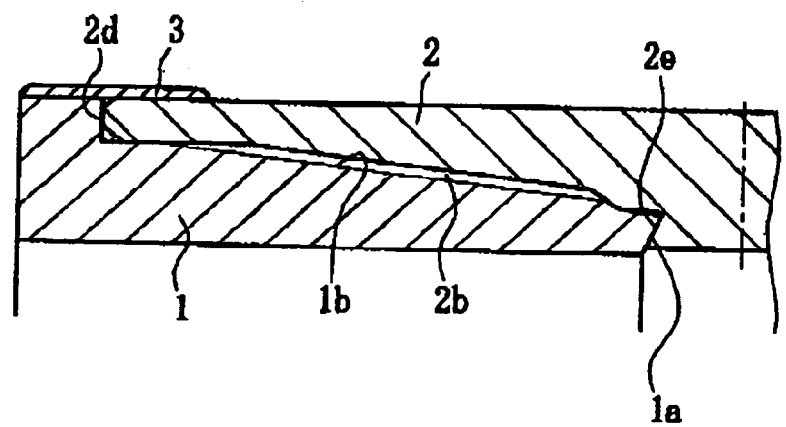

With a conventional female thread protector 1 as shown in FIG. 7(b) (which usually does not include the sealing tape 3 shown in this figure), dirt is prevented from reaching the female threads 2b' of a pipe 2 by contact between an internal shoulder 2e of the pipe 2 and the end surface 1a of the protector 1, and by contact between the end surface 2d of the pipe 2 and a shoulder 1e formed on the exterior of the protector 1.

However, like a male thread protector, after a female thread protector 1 is mounted on a pipe 2 by threaded engagement, there is the possibility of the protector loosening with respect to the pipe by impact applied during transfer between different vehicles, for example, before the protector is removed by a customer immediately before use. With the conventional female thread protector 1 of FIG. 7(b), since the formation of a seal between the protector 1 and the box end of a pipe 2 relies upon the compression of the body of the protector 1 where it contacts the internal shoulder 2e and end surface 2d of the pipe 2, loosening of the protector 1 results in the formation of gaps in these regions, and dirt and water can reach the female threads 2b' of the pipe 2 through the gaps unless grease is applied to the threads 2b. Furthermore, in situations in which grease is not applied, contact between the thread protector 1 and the pipe 2 allows seepage of water to the female threads 2b' of the pipe 2 by capillary action in contacting portions, resulting in rusting of the threads.

In order to solve these problems, in the embodiments of a female thread protector 21 shown in FIGS. 3 and 4, a valve-type sealing mechanism comprising an elastically flexible annular sealing projection 21a is provided on the body of the protector 21 at least on the outer surface of the protector 21 in a location in which it can sealingly contact the end surface 2d of the box end of a pipe 2 when the female threads 2b' of the pipe 2 are engaged with the male threads 21b of the protector 21. An additional valve-type sealing mechanism comprising an elastically flexible annular sealing projection 21c may also be formed on the end surface of the protector 21 in a location where it can contact the edge of the internal shoulder 2e of a pipe 2 when the female threads 2b' of the pipe 2 are engaged with the male threads 21b of the protector 21. In the embodiments of FIGS. 3 and 4, the female thread protector 11 has annular sealing projections 21a and 21c in both locations.

As is the case with the annular sealing projections 11a of the above-described embodiments of a male thread protector 11, a contact force between the annular sealing projection 21a or 21c and a pipe 2 on which the protector 21 is mounted is produced by elastic flexing of the annular sealing projections 21a and 21c. This flexing enables the sealing projections 21a and 21c to maintain sealing contact with the pipe 2 over a substantial range of motion of the sealing projections 21a and 21c. Therefore, even if loosening of the protector 21 with respect to a pipe 2 develops in the period between when the protector 21 is secured to the pipe 2 by threaded engagement and the pipe 2 is used by a customer, the sealing projections 21a and 21c can maintain sealing contact with the pipe 2 and prevent dirt and water from reaching the threads of the pipe 2.

Due to the ability of the sealing projections 21a and 21c to elastically flex, variations in the distance between the end surface 2d and the internal shoulder 2e of the pipe 2 due to manufacturing errors can be absorbed by the flexible sealing projections 21a and 21c, thereby enabling both sealing projections 21a and 21c to remain in sealing contact with the pipe 2. Both of the annular sealing projections 21a and 21c form line contact with the corresponding portions 2d and 2e of the pipe 2, so capillary action does not take place in the regions of contact, and even without using grease, seeping of water to the threads of the pipe 2 can be prevented.

(3) Valve-Type Sealing Mechanisms of Protectors 11 and 21

As described above, the valve-type sealing mechanisms (the annular sealing projections 11a, 21a, and 21c) of the above-described thread protectors 11 and 21 according to the present invention are capable of elastically flexing to maintain sealing contact with an end surface or an internal shoulder of a pipe 2 which is to be protected, even when looseness develops between the protectors 11 and 21 and a pipe on which they are mounted.

In order for the valve-type sealing mechanisms (the annular sealing projections 11a, 21a, and 21c) to produce an effective sealing effect, it is desirable for their design to be such that they remain in line contact and do not come into surface contact with the corresponding portions of a pipe when the protectors 11 and 21 are tightened as much as possible with respect to the threads of a pipe. This is because capillary action occurs when sealing portions are in surface contact. In addition, the design of the sealing mechanisms is preferably such that even if the protectors 11 and 21 are loosened by a certain amount with respect to a pipe 2 on which they are mounted, the elasticity of the annular sealing projections 11a and 21a enables the sealing projections to remain in sealing contact with the pipe 2. Preferably the sealing projections 11a and 21a can cope with loosening of the protectors 11 and 21 on the order of ½-1 turn.

Figure 5A:
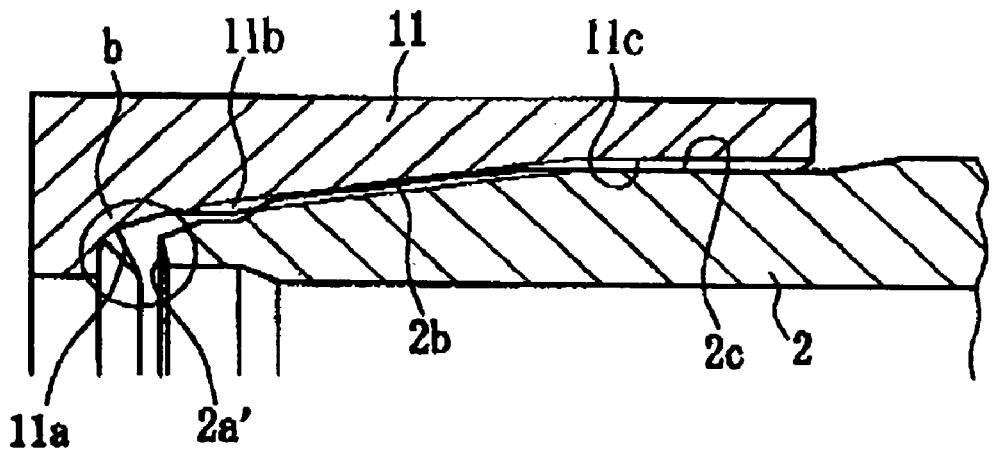
FIG. 5(a) is a partial schematic longitudinal cross-sectional view of the embodiment of FIG. 2(b) in a state in which the sealing projection of the thread protector is spaced from the end of the pipe on which the thread protector is mounted.
Figure 5B:
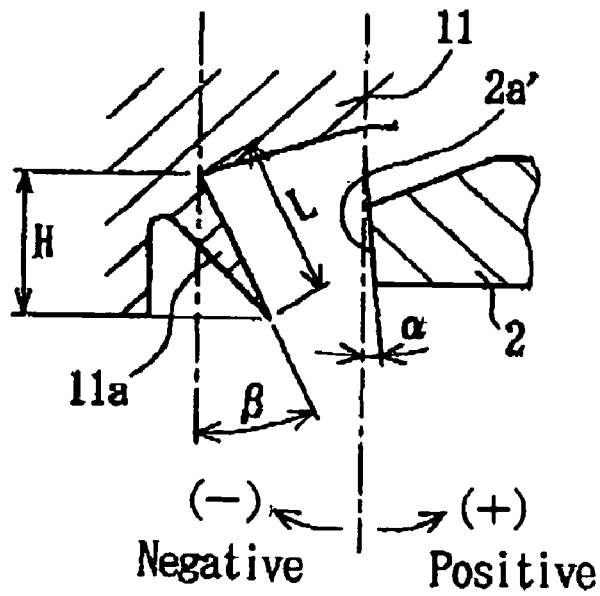
FIG. 5(b) is an enlarged view of region 12 of FIG. 5(a)
Figure 5C:
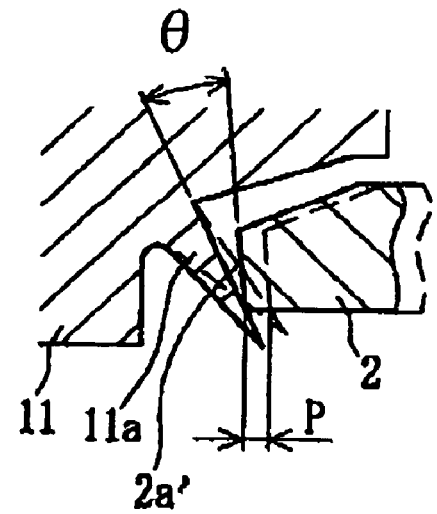
FIG. 5(c) is an enlarged view of the same region as in FIG. 5(b) in a state in which the thread protector has been tightened with respect to the pipe such that the angle between the sealing projection of the thread protector and the end surface of the pipe is a minimum.

In order to ensure that the annular sealing projections 11a, 21a, and 21c are prevented from coming into surface contact with the pipe 2, the protectors 11 and 21 are preferably designed such that the angle θ between the surface of the sealing projection and the surface of the pipe with which the sealing projection is in sealing contact is at least approximately 20° when the protector is tightened as much as possible with respect to the pipe [see FIG. 5(c)]. Thus, the minimum angle θ when the protector is tightened as much as possible is preferably in the range of 15°-25° and more preferably approximately 20°. Such a design of the protectors can be achieved by adjusting the thread diameter of the protectors in accordance with the thread diameter of the threads of a pipe on which the protectors are to be mounted on the other hand, in order to cope with loosening of the protectors 11 and 21, the annular sealing projections 11a, 21a, and 21c should maintain their ability of sealing by contact with the pipe 2 when the maximum number of loosening turns occurs. The minimum height H of the annular sealing projections 11a, 21a, and 21c in the radial direction of the pipe 2 (normal to the pipe axis) necessary for these sealing projections to remain in line contact with the pipe 2 when loosening of the protectors 11 and 21 by the maximum number of loosening turns takes place can be calculated by the following Equation (1), in which the variables has the values shown in FIG. 5(b) with respect to a male thread protector 11:

$$H = (N \times TL \times \cos\beta) / [\sin\beta - \sin(20° - \alpha)] \quad (1)$$

In the above equations,

N: maximum number of loosening turns of a thread protector 11 from the position of maximum tightening on a pipe 2;

(P: maximum distance of loosening corresponding to N turns;)

TL: thread lead of the pipe 2;

β: angle of the sealing surface of the annular sealing projection 11a with respect to the radial direction of the protector 11 prior to tightening on the pipe 2;

(L: length of the annular sealing projection 11a measured along its sealing surface;)

α: slope with respect to the radial direction of the surface of the pipe 2 which the annular sealing projection 11a contacts [i.e., surface 2a' in FIG. 5(b)].

If, for example, the maximum number of loosening turns N is 1.0 turn, the thread lead TL is 5.08 mm, the slope a of the end surface 2a' of the pipe 2 on which the annular scaling projection 11a acts is +5.0°, and the angle β of the annular sealing projection 11a prior to tightening of the protector 11 is 45°, by plugging these values into Equation (1) in the manner shown below, the minimum height H of the annular sealing projection 11a in the radial direction of the pipe 2 necessary to maintain line contact when loosening by the maximum number of turns takes place becomes 8.01 mm.

$$H = (1.0 \times 5.08 \times \cos 45°) / \{\sin 45° - \sin(20° - 5°)\} = 8.01 \text{ mm}$$

The slope α of the surface 2a' of the pipe 2 on which the annular sealing projection 11a acts takes a positive or negative value as shown in FIG. 5(b).

The above description shows the calculation of the height H of an annular sealing projection 11a of a male thread protector 11. The height of the sealing projections 21a and 21c of a female thread protector 21 can be determined in a similar manner.

(4) Sealing Mechanism of a Male Thread Protector with Respect to the Outer Surface of a Pipe A female thread protector 21 according to the present invention can be provided with two annular sealing projections 21a and 21c as shown in FIGS. 3 and 4, thereby making it possible to prevent dirt and water from reaching the female threads 2b' of a pipe 2 on which the protector is mounted from both the interior and exterior of the pipe 2.

On the other hand, as shown in FIG. 5(a), for example, a male thread protector 11 according to the present invention has only one annular sealing projection 11a to prevent dirt and water from reaching the male threads 2b of a pipe 2 on which the protector 11 is mounted from the interior of the pipe 2.

As discussed previously, penetration of dirt and water to the male threads 2b of the pipe 2 from the exterior of the pipe 2 can by prevented by providing the male thread protector 11 with an extended cylindrical region 11c which is brought into contact with the outer surface of an outermost body region 2c of the pipe 2 (a region of the pipe body adjoining the male threads 2b). In order for this outer surface sealing mechanism (which forms a seal against the outer surface of a pipe) of a male thread protector 11 to act effectively, it is necessary to eliminate or minimize a gap between the inner surface of the cylindrical region 11c of the male thread protector 11 and the outer surface of the outermost body region 2c of the pipe 2.

Figure 6A:
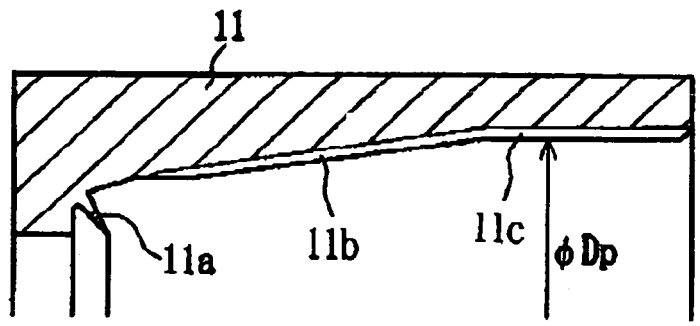
FIG. 6(a) is a partial schematic longitudinal cross-sectional view of an embodiment of a male thread protector.
Figure 6B:
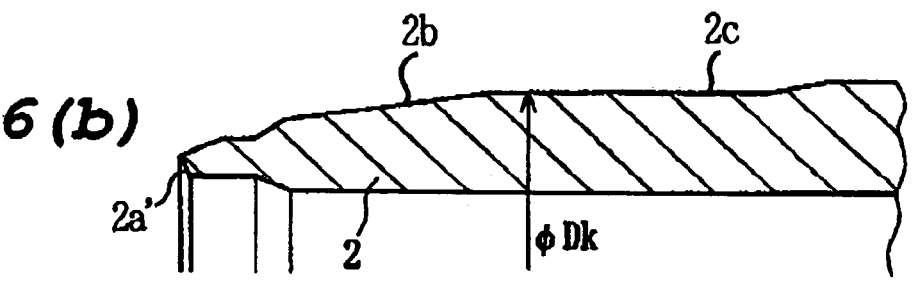
FIG. 6(b) is a partial schematic longitudinal cross-sectional view of the pin end of a pipe for use with the protector of FIG. 6(a), the outer surface of the pipe body having a machined cylindrical region adjoining the pin.
Figure 6C:
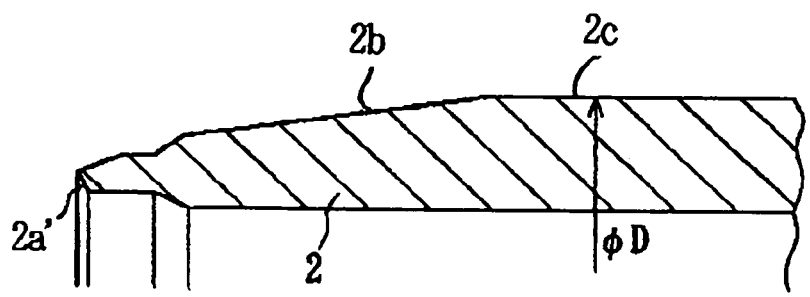
FIG. 6(c) is a figure similar to FIG. 6(b) in which the outer surface of the pipe body adjoining the pin is not machined.

For a male thread protector 11 for use with a pipe 2 like that shown in FIG. 6(c) having an unmachined outer surface, with respect to the average $\phi_D$ of the maximum and minimum tolerable outer diameters of the pipe 2, the inner diameter $\phi_{Dp}$ of the cylindrical region 11c of a male thread protector 11, which is measured to the crest of the helical protrusion 11c' formed on the inner surface of the protector 11 if such protrusion 11'c is present, is preferably in the range given by the following Equation (2), which takes into consideration variations at the time of manufacture:

$$\phi_{Dp} = \phi_D - \{\phi_D \times (0.0\% \text{ to } 0.1\%)\} \quad (2).$$

With steel pipes and particularly steel pipes for OCTG, the actual outer diameter of a finished pipe is often larger than the average of the maximum and minimum tolerable outer diameters of the pipe. In such cases, in order to prevent a situation in which the gap between the protector 11 and the steel pipe 2 expands or the protector 11 is press fit onto the pipe 2 thereby making it impossible to either tighten or loosen the protector 11, $\phi_D$ is preferably made the mean value of the finished outer diameter of the pipe 2.

Similarly, when the region 2c of the outer surface of the steel pipe 2 which is brought into contact with the cylindrical region of the protector 11 is machined to make a substantially perfectly cylindrical outer surface, the protector 11 is preferably manufactured such that the inner diameter $\phi_{Dp}$ of the cylindrical region thereof satisfies the following Equation (3), wherein $\phi_{Dk}$ is the average of the maximum and minimum tolerable outer diameter of the machined surface 2c of the pipe:

$$\phi_{Dp} = \phi_{Dk} - \{\phi_{Dk} \times (0.0\% \text{ to } 0.1\%)\} \quad (3).$$

Even when the outer surface of a region 2c of a pipe 2 is machined, there is some variation in the outer diameter $\phi_{Dk}$ of the machined surface. This variation can be within the range of +0.1% to −0.0% with respect to the design value, and it is preferably +0.05% to −0.0%.

EXAMPLES

The following experiments were performed to investigate the effects of a thread protector for a pipe according to present invention.

The steel pipes used in the experiments were steel pipes with an outer diameter of 244.50 mm and had a pin on one end and a box on the other end formed by thread cutting. The pin had an unthreaded nose portion on its end for metal-to-metal contact, so the box also had an unthreaded portion corresponding to the nose portion. The outer surface of the outermost body region 2c of each pipe adjoining the pin was not machined.

The male threads 2b formed on the pin ends of the pipes did not undergo any surface treatment, while the female threads 2b' formed on the box ends thereof were subjected to surface treatment with a phosphate. A low viscosity oil having a dynamic viscosity of 2.5 mm²/sec at 40° C. was then applied to both the male and female threads of the pin and box of each steel pipe. Thereafter, a male thread protector and a female thread protector according to the present invention of the type shown in FIG. 2(a) and FIG. 4 which did not close off the interior of a pipe were secured to the pin end and box end of each pipe. Each protector was either tightened by the maximum amount with respect to the pipe, or else was loosened by 1.0 turn from the position of maximum tightening.

The male and female protectors according to the present invention were designed and manufactured such that each of the annular sealing projections could maintain a seal with respect to a pipe when loosened by 1.0 turn from a position of maximum tightening.

For comparison, the same experiments as above were repeated using conventional male and female thread protectors of the type shown in FIGS. 7(a) and 7(b) in which the sealing tape 3 was not applied.

Each steel pipe protected by a male and a female protector on each end was left for one month in an environment promoting corrosion, and the ability of the protectors to prevent ingress of dirt and prevent rusting was evaluated.

Neither penetration of dirt to the male or female threads of the pipe nor the occurrence of rust was observed when a thread protector according to the present invention was either tightened as much as possible with respect to a pipe or when it was loosened by 1.0 turns from a position of maximum tightening.

When a conventional male thread protector was tightened as much as possible, neither penetration of dirt nor occurrence of rust was observed in a region of a pin end of a pipe near the end of the pipe (in the vicinity of the region of shoulder abutment between the pin end and the male protector). However, on the outer side of the pin end of the pipe, the ingress of dirt was observed, and rusting occurred at an average rate of 3 locations per cm². In the case of a conventional female thread protector, due to the presence of shoulder abutment adjoining each end of the threaded region of a pipe, no penetration of dirt or occurrence of rust was observed at the box end of the pipe when the female thread protector was tightened as much as possible.

When the conventional male thread protector was loosened by 1.0 turns from a position of maximum tightening, ingress of dirt to all locations on the end of the pipe was observed, and rusting was observed at an average rate of 5 locations per cm². Similar ingress of dirt and rusting were observed with the conventional female thread protector when it was loosened by 1.0 turns.

Portions of a thread protector according to the present invention which contact a pipe and which form a sealing mechanism are preferably made of a synthetic resin such as a polyamide, an epoxy resin, or the like which has elasticity and at the same time will not easily scratch the threads or the portions of the pipe against which a seal is formed. The entire protector may be manufactured of such an elastic material, or portions of the protector which do not contact the threads or the portions of the pipe against which a seal is formed may be reinforced by steel or other metal. The annular sealing projection or projections of the protector are preferably formed from the same material as that constituting the body of the protector. Although these projections may be separately formed and bonded to the body of the protector by heat sealing, for example, they are preferably integral with the body of the protector and formed along with the body by injection molding or any other suitable molding method.

In order to obtain a protector having finished dimensions such that the protector can effectively form a seal against a pipe, the protector is preferably machined in portions of the protector which contact the threads or other portions of the pipe. Thus, the threads of the protector are preferably formed by thread cutting. In the case of a male thread protector having a helical groove in its cylindrical region, the helical groove may be formed simultaneously with or separately from the female threads of the protector.

In the above-described embodiments, the end surface 2a' of a pin end of a pipe 2 with which the annular sealing projection 11a of a male thread protector 11 is in line contact is designed for abutment against an internal shoulder of a box end of another pipe, but this end surface may be a mere end surface of a pipe which is made by severing or machining of the pipe, like the end surface of a box end with which the annular sealing projection 21a of a female thread protector 21 is in line contact.

As demonstrated above, by use of a male (pin) or female (box) protector according to the present invention, even if a grease having a comparatively high viscosity and containing a heavy metal powder is not applied to the threads of a pipe, ingress of dirt and water and the occurrence of rust can be effectively prevented, and dirt and water can be prevented from penetrating to the threads from either the interior or exterior of a steel pipe. The seal provided by a protector according to the present invention can withstand the pressure applied in a hydrostatic pressure test. Thus, the protector can prevent seepage of water during such a test.

What is claimed is:

1. A thread protector for protecting a threaded end portion of a metal pipe comprising:
   a body having threads for threaded engagement with threads formed on a threaded end portion of a pipe; and
   a valve-type elastically flexible annular sealing projection with opposing faces, each opposing face radially extending from the body such that the sealing projection elastically flexes when one of the opposing faces is line contacted by an end surface of the pipe when the threads of the protector are engaged with the threads of the pipe,
   wherein a minimum height of the valve-type elastically flexible annular sealing projection in a radial direction of the pipe necessary for the sealing projection to remain in contact with the pipe when loosening of the thread protector occurs is H, and H is defined as follows:
   H=(N×TL×cos β)/[sin β-sin(20°-α)], wherein
   N is the maximum number of loosening turns of the thread protector from a position of maximum tightening on the pipe,
   TL is the thread lead of the pipe,
   β is an angle of a sealing surface of the sealing projection with respect to the radial direction of the thread protector prior to tightening on the pipe, and
   α is a slope with respect to the radial direction of the surface of the pipe which the sealing projection contacts.

2. A thread protector as claimed in claim 1 wherein the sealing projection is integral with the body.

3. A thread protector as claimed in claim 2 wherein the body and the sealing projection are made of a synthetic resin.

4. A thread protector as claimed in claim 3 wherein at least part of the body of the protector is reinforced with a metal.

5. A threaded protector as claimed in claim 1 wherein the threads of the protector arc shaped for engagement with tapered threads of a pipe.

6. A thread protector as claimed in claim 1 wherein the body of the protector has female threads for engaging male threads formed on a pin end of a pipe, and the sealing projection is disposed on an interior of the body.

7. A thread protector as claimed in claim 6 wherein an end surface of the pin end of the pipe is designed for abutment against an internal shoulder of a box end of another pipe.

8. A thread protector as claimed in claim 6 wherein the body of the protector includes a cylindrical region having a generally cylindrical inner surface which surrounds and contacts an outer surface of an outermost region of a cylindrical body of the pipe when the threads of the pipe engage the threads of the protector.

9. A thread protector as claimed in claim 8 wherein the cylindrical region has a generally cylindrical inner surface which surrounds and contacts an outer surface of an outermost region of a cylindrical body of the pipe, which outer surface is machined so as to have a substantially perfect circular radial cross section.

10. A method of protecting threads of a pipe comprising engaging male threads formed on a pin end of a pipe with the threads of the thread protector of claim 8 so as to bring the sealing projection into line contact with an end surface of the pipe and achieve contact of the inner surface of the cylindrical region of the protector with an outer surface of the pipe.

11. A thread protector as claimed in claim 8 wherein the generally cylindrical inner surface of the cylindrical region of the protector has a helical groove defining a helical protrusion which contacts the outer surface of the outermost region of the cylindrical body of the pipe when the threads of the pipe engage the threads of the protector.

12. A read protector as claimed in claim 11 wherein the helical groove is terminated short of an end of the cylindrical region.

13. A method of protecting threads of a pipe comprising engaging threads formed on an end of a pipe with the threads of the thread protector of claim 1 so as to bring the sealing projection into line contact with an end surface of the pipe.

14. The thread protector of claim 1, wherein the sealing projection has a radial width that is at least as large as a wall thickness of the end of the pipe.

15. A female thread protector for protecting a threaded end portion of a metal pipe comprising:
a body having male threads for threaded engagement with female threads formed on a threaded end portion of a pipe having an internal shoulder;
a valve-type elastically flexible annular sealing projection formed on an end of the body of the protector, the sealing projection having opposing faces, each opposing face radially extending from the end of the body such that the sealing projection elastically flexes when one of the opposing faces is line contacted by the internal shoulder of the pipe when the threads of the protector are engaged with the threads of the pipe,
wherein a minimum height of the valve-type elastically flexible annular sealing projection in a radial direction of the pipe necessary for the sealing projection to remain in contact with the pipe when loosening of the thread protector occurs is H, and H is defined as follows:
$H=(N \times TL \times \cos \beta)/[\sin \beta - \sin(20°-\alpha)]$, wherein
N is the maximum number of loosening turns of the thread protector from a position of maximum tightening on the pipe,
TL is the thread lead of the pipe,
β is an angle of a sealing surface of the sealing projection with respect to the radial direction of the thread protector prior to tightening on the pipe, and
α is a slope with respect to the radial direction of the surface of the pipe which the sealing projection contacts.

16. A method of protecting threads of a pipe comprising engaging female threads formed on an end of a pipe having an internal shoulder with the threads of the thread protector of claim 15 so as to bring the sealing projection into line contact with a surface of the internal shoulder of the pipe.

17. The female thread protector of claim 15, wherein the sealing projection has a radial width that is at least as large as a width of the internal shoulder of the pipe.

18. A female thread protector for protecting a threaded end portion of a metal pipe comprising:
a body having male threads for threaded engagement with female threads formed on a threaded end portion of a pipe having an internal shoulder;
a first valve-type elastically flexible annular sealing projection extending from the body of the protector, the first sealing projection having opposing faces, each opposing face radially extending outwardly from a longitudinal axis of the body such that the sealing projection elastically flexes when one of the opposing faces is line contacted by an end surface of the pipe when the threads of the protector are engaged with the threads of the pipe; and
a second valve-type elastically flexible annular sealing projection formed on the body of the protector, the second sealing projection having opposing faces, each opposing face radially extending inwardly towards the longitudinal axis of the body such that the seating projection elastically flexes when one of the opposing faces is line contacted by the internal shoulder of the pipe when the threads of the protector are engaged with the threads of the pipe.

19. The female thread protector of claim 18, wherein the first sealing projection has a radial width that is at least as large as a wall thickness of the end of the pipe and the second sealing projection has a radial width that is at least as large as a width of the internal shoulder of the pipe.

20. A method of protecting threads of a pipe comprising engaging female threads formed on an end of a pipe having an internal shoulder with the threads of the thread protector of claim 18 so as to bring the first sealing projection into line contact with an end surface of the pipe and the second sealing projection into line contact with the internal shoulder of the pipe.

21. A female thread protector of claim 18, wherein a minimum height of the each of the first valve-type elastically flexible annular sealing projection wherein a minimum height of the first valve-type elastically flexible annular sealing projection in a radial direction of the pipe necessary for the sealing projection to remain in contact with the pipe when loosening of the thread protector occurs is H, and H is defined as follows:
$H=(N \times TL \times \cos \beta)/[\sin \beta - \sin(20°-\alpha)]$, wherein
N is the maximum number of loosening turns of the thread protector from a position of maximum tightening on the pipe,
TL is the thread lead of the pipe,
β is an angle of a sealing surface of the sealing projection with respect to the radial direction of the thread protector prior to tightening on the pipe, and
α is a slope with respect to the radial direction of the surface of the pipe which the sealing projection contacts.

* * * * *